United States Patent
Deivasigamani et al.

(10) Patent No.: US 12,228,293 B2
(45) Date of Patent: Feb. 18, 2025

(54) HEATING SYSTEM

(71) Applicant: Intellihot, Inc., Galesburg, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

( * ) Notice: Subject to any disclaimer, the term of this patent is extended or adjusted under 35 U.S.C. 154(b) by 417 days.

(21) Appl. No.: 17/016,471

(22) Filed: Sep. 10, 2020

(65) Prior Publication Data

US 2022/0074604 A1    Mar. 10, 2022

(51) Int. Cl.
| | |
|---|---|
| F24D 17/02 | (2006.01) |
| F24D 17/00 | (2022.01) |
| F24D 19/10 | (2006.01) |
| F24H 1/12 | (2022.01) |
| F24H 7/02 | (2022.01) |

(52) U.S. Cl.
CPC ......... *F24D 17/02* (2013.01); *F24D 17/0005* (2013.01); *F24D 17/0073* (2013.01); *F24D 19/1054* (2013.01); *F24H 1/121* (2013.01); *F24H 7/02* (2013.01); *F24D 2200/123* (2013.01)

(58) Field of Classification Search
CPC .. F24D 19/1054; F24D 17/0073; F24D 17/02; F24D 17/0005; F24D 2200/123; F24D 17/0089; F24D 19/1051; F24H 1/121; F24H 7/02; F24H 1/121; Y02B 30/18
USPC ....................................................... 237/2 B
See application file for complete search history.

(56) References Cited

U.S. PATENT DOCUMENTS

| | | | | |
|---|---|---|---|---|
| 2,575,325 A | * | 11/1951 | Ambrose | F25B 5/02 |
| | | | | 62/181 |
| 5,791,401 A | * | 8/1998 | Nobile | F24D 17/0005 |
| | | | | 165/47 |
| 6,574,426 B1 | * | 6/2003 | Blanco, Jr. | F24H 1/102 |
| | | | | 392/485 |
| 9,482,446 B2 | * | 11/2016 | Nomoto | F24D 19/0092 |
| 2009/0139688 A1 | * | 6/2009 | McLeod | F28D 21/0012 |
| | | | | 165/47 |
| 2010/0209084 A1 | | 8/2010 | Nelson et al. | |
| 2013/0228309 A1 | * | 9/2013 | Wood | F25B 30/06 |
| | | | | 165/104.22 |
| 2015/0159960 A1 | * | 6/2015 | Fujitsuka | F24D 17/02 |
| | | | | 165/10 |

(Continued)

*Primary Examiner* — Steven B McAllister
*Assistant Examiner* — John E Bargero
(74) *Attorney, Agent, or Firm* — Jong Patent Firm; Cheng Ning Jong; Tracy P. Jong (57) ABSTRACT

A heating system including a water conductor, a valve configured to cooperate with a fluid moving device which together operable to selectively circulate a heat transfer fluid in at least one of a first fluid circuit and a second fluid circuit, a heat exchanger and a blower operable to supply a stream of fluid over the heat exchanger, wherein the heat exchanger is fluidly connected to the first fluid circuit, wherein the heat exchanger being disposed to transfer heat between the heat transfer fluid and the heat exchanger, a coil fluidly connected to the second fluid circuit, wherein the coil is configured to be disposed on a drainage tube to transfer heat between the heat transfer fluid and the coil, a final heat exchanger configured for thermally coupling the first fluid circuit and the water conductor and the second fluid circuit and the water conductor.

16 Claims, 6 Drawing Sheets

(56) References Cited

U.S. PATENT DOCUMENTS

2017/0241649 A1* 2/2017 Cave .................. F24D 19/1081
2018/0118592 A1* 5/2018 Rosko ....................... C02F 1/78
2019/0128565 A1 5/2019 Pugh et al.

* cited by examiner

HEATING SYSTEM

BACKGROUND OF THE INVENTION

1. The Field of the Invention

The present invention relates to a heating system. More specifically, the present invention is directed to an under sink heat pump.

2. Background Art

Various fossil fuel phase-out initiatives have been made in the heating industry and mandates have been increasingly devised and implemented to phase out the direct or indirect use of fossil fuel in heat production for domestic and/or industrial uses. Attempts have been made to heat domestic water with alternative means, e.g., with the use of heat pumps having operations that are primarily driven using electricity in the form of pump or compressor operations. Supplemental electric heating elements may also be employed to aid fossil fuel-free domestic water heating systems in meeting heating demands. However, the need to meet heating demands have driven designers to return to tanked solutions which bring back the disadvantages associated with such solutions, one of the disadvantages being the exposure of stagnant domestic water disposed at temperature ranges suitable for Legionella proliferation when hot water demands are small, over extended periods. Two examples of tanked solutions are included herein where domestic hot water is supplied directly from a tank in each of these examples:

U.S. Pat. Pub. No. 20190128565 of Pugh et al. (hereinafter Pugh) discloses a heat pump water heater having a tank, a heat source and a heat pump system. The heat pump system has a refrigerant path, at least a portion of which is in thermal communication with the water tank volume such that heat transfers from a refrigerant to the water tank volume. A fan causes air to flow through a housing, and another portion of the refrigerant path includes an evaporator in the housing. The fan is within the housing and may further be within a second housing. The first housing may include a baffle to direct air flow. The fan may be a variable speed fan in communication with a controller, so that the controller controls the fan speed depending on a temperature of the refrigerant.

U.S. Pat. Pub. No. 20100209084 of Nelson et al. (hereinafter Nelson) discloses a heat pump water heater and systems and methods for its control. The systems are configured to heat water within a water storage tank of a heat pump water heater wherein a controller within the system is operatively connected to a plurality of heat sources including at least one electric heating element and a heat pump and sensors in order to selectively energize one of the plurality of heat sources. The controller is configured to process data representative of the temperature of water within the tank near the top of the water storage tank, and rate of water flowing out of the water storage tank, in order to automatically selectively energize the heat sources. The selection of heat sources by the controller is determined by a mode of operation selected by the user and the data processed by the controller in view of the selected mode of operation.

Each of Pugh and Nelson discloses the use of a large thermal storage tank that accommodates demands of hot water. As each of Pugh and Nelson's tanks holds a significant amount of water to anticipate demands, there is no guaranty that all portions of the heated water in the tank will exit the tank and be replaced with fresh cold or unheated water. If insufficiently used and the water held in the tank is not consumed or replaced over a long period of time, Legionella can proliferate and the next user/s can be exposed to a heightened level of Legionella risk.

There exists a need for a heating system that is not reliant on fossil fuel and one which is not exposed to the same Legionella risks plaguing tanked domestic water heating systems.

SUMMARY OF THE INVENTION

In accordance with the present invention, there is provided a heating system including:

(a) a water conductor including an inlet and an outlet, the inlet configured for receiving a domestic water flow;

(b) a valve configured to cooperate with a fluid moving device which together operable to selectively circulate a heat transfer fluid in at least one of a first fluid circuit and a second fluid circuit;

(c) a heat exchanger and a blower operable to supply a stream of fluid over the heat exchanger, wherein the heat exchanger is fluidly connected to the first fluid circuit, wherein the heat exchanger being disposed to transfer heat between the heat transfer fluid and the heat exchanger, whereby heat is transferred between the heat transfer fluid and the stream of fluid over the heat exchanger;

(d) a coil fluidly connected to the second fluid circuit, wherein the coil is configured to be disposed on a drainage tube to transfer heat between the heat transfer fluid and the coil, whereby heat is transferred between the heat transfer fluid and contents of the drainage tube;

(e) a final heat exchanger configured for thermally coupling the first fluid circuit and the water conductor and the second fluid circuit and the water conductor, whereby heat is transferred between the heat transfer fluid to the domestic water flow; and (f) a control device operable to control the fluid moving device to circulate the heat transfer fluid in the first fluid circuit, the blower and the valve by disposing the valve in a first position in response to a first hot water demand, the control device being further operable to control the fluid moving device to circulate the heat transfer fluid in the second fluid circuit, and the valve by disposing the valve in a second position in response to a second hot water demand, the control device being further operable to control the fluid moving device to circulate the heat transfer fluid in the first fluid circuit, the blower and the valve by disposing the valve in a first position in response to a first thermal charging demand and the control device being further operable to control the fluid moving device to circulate the heat transfer fluid in the second fluid circuit, and the valve by disposing the valve in a second position in response to a second thermal charging demand.

In one embodiment, the fluid moving device is a compressor, wherein the heating system further includes an expansion valve fluidly connected to the first fluid conductor and the second fluid conductor. In one embodiment, the heating system further includes a tank including a bath, each of a portion of the first fluid conductor and a portion of the second fluid conductor disposed through the bath of the tank is a heat exchanger being disposed to transfer heat between the bath and the heat transfer fluid. In one embodiment, the bath is water. In another embodiment, the bath is a phase change material (PCM). In one embodiment, the heating system further includes at least one heating element configured to be disposed within the bath of the tank. In one embodiment, the heat transfer fluid is a refrigerant. In one embodiment, the inlet of the water conductor is disposed through the bath of the tank. In one embodiment, the inlet of the water conductor comprises a coil configured for pre-heating the domestic water flow. In one embodiment, the heating system further includes an electric battery configured for storing electric power and powering at least one of the fluid moving device, the blower and the control device. In one embodiment, the valve is a 3-way valve. In one embodiment, the heating system further includes an ozone generator configured for sanitizing the domestic water flow.

An object of the present invention is to provide a heating system for domestic hot water at or near a point of use.

Another object of the present invention is to provide a heating system sufficiently compact to fit in the space underneath a sink or point of use.

Another object of the present invention is to provide a heating system capable of recovering heat energy otherwise left untapped and wasted.

Another object of the present invention is to provide a heating system powered using a minimal power plant with heating load ranging from several kilowatts to an upper limit of tens of kilowatts.

Another object of the present invention is to provide a heating system capable of providing hot water with a minimal delay, e.g., a delay of mere seconds.

Another object of the present invention is to provide a heating system powered only by electricity.

Another object of the present invention is to provide a heating system that is at least temporarily self-sustaining.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—heating system
4—fluid circuit
6—fluid circuit
8—3-way valve
10—heat exchanger
12—heat exchanger, e.g., coil
14—heat exchanger
16—blower
18—expansion valve
20—tank
22—heating element
24—electric battery
26—compressor
28—J bend tube
30—drain tailpiece
32—drain fitting
34—water inlet
36—water outlet
38—control device
40—water conductor
42—portion of first or second fluid circuit disposed within bath of tank
44—sink
46—faucet
48—ozone generator
50—coil
52—effluent
54—heat transfer fluid, e.g., refrigerant
56—thermal paste
58—wall which contains thermal paste
60—section or half of coil Particular Advantages of the Invention The present heating system is capable of recovering heat energy from a drain to which the heating system is thermally coupled. When hot water is used in a sink, a tremendous amount of heated water which still contains a large amount of heat energy is drained down a drainage tube. Without a mechanism for recovering this effluent, a large amount of heat energy would be carried with the effluent into either a sewer or septic system and left untapped.

The present heating system can be provided close to a point of use, e.g., a sink. It therefore does not require long fluid conductors to send hot water from the point water is heated to a point where the hot water is consumed or used.

The present heating system does not include a tank for storing potable hot water in anticipation of a potable hot water demand. As such, no stratification of potable water held in a tank can occur. Although one or more temperature sensors may be used for providing feedback to heating of the contents of a tank water heater to achieve a setpoint temperature, the effect of stratification can cause layers of fluid having different temperatures in the tank water heater.

Therefore, although portions of the contents of a water heater may be disposed at a setpoint temperature that is unfavorable for Legionella proliferation, there potentially exists other portions that may be disposed at temperatures suitable for Legionella proliferation, especially when the contents have been left unused for an extended period of time.

The present heating system is capable of storing heat energy harnessed from an around the heating system. In one mode, the present heating system is capable of storing heat energy harnessed from an indoor ambient of a heat exchanger. In one embodiment, supplemental or additional heat energy can be supplied by heating elements disposed within the bath of the present tank and powered by grid electricity, solar power means and wind power means. In one embodiment, hot water can be provided even in the event of an electric power failure as a demand of hot water can be met by heating in the incoming cold water supply with the heat energy stored in a tank.

As the present heating system includes a domestic water supply that is not fluidly connected to a tank characterized by a low flowrate within the tank, the present system significantly reduces the opportunity for a water flow to deposit scale within the water conductor of the system as the water flow occurs through fluid conductors of a smaller inner diameter instead of the significantly larger volume of a tank.

As the present heating system includes an electric battery, the present system reduces the downtime if grid power is down as the system continues to be operational even if grid power is unavailable. Further, the electric battery serves as a sink for electric grid power when its pricing is favorable or low or when the demand for grid power is low.

Hard water causes unwanted mineral deposits (scaling) on the fluid contact surfaces of the water heater system. Severe scaling can cause severe drop in the water heater efficiency and life span. Scale deposits in the interior surfaces of heat exchanger tubes can reduce the heat exchanger efficiency as the scale deposits reduce heat transfer rate from the exterior to the interior surfaces of the heat exchanger tubes. Therefore, more heat would be required to raise each degree of water temperature. Excessive scale deposits, or any other like issues, that cause reduced heat exchanger efficiency, can lead to overheating of the exterior surfaces of a heat exchanger resulting in a shortened heat exchanger service life. In addition to resulting in damage to the heat exchanger, overheating of the heat exchanger exterior surfaces leads to undue energy loss. As the contents or bath of the present tank is isolated from the domestic water delivered to an end user, the speed of a flow through the domestic water conductor is significantly higher than a flow through a tank, thereby reducing the likelihood that scaling can occur.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
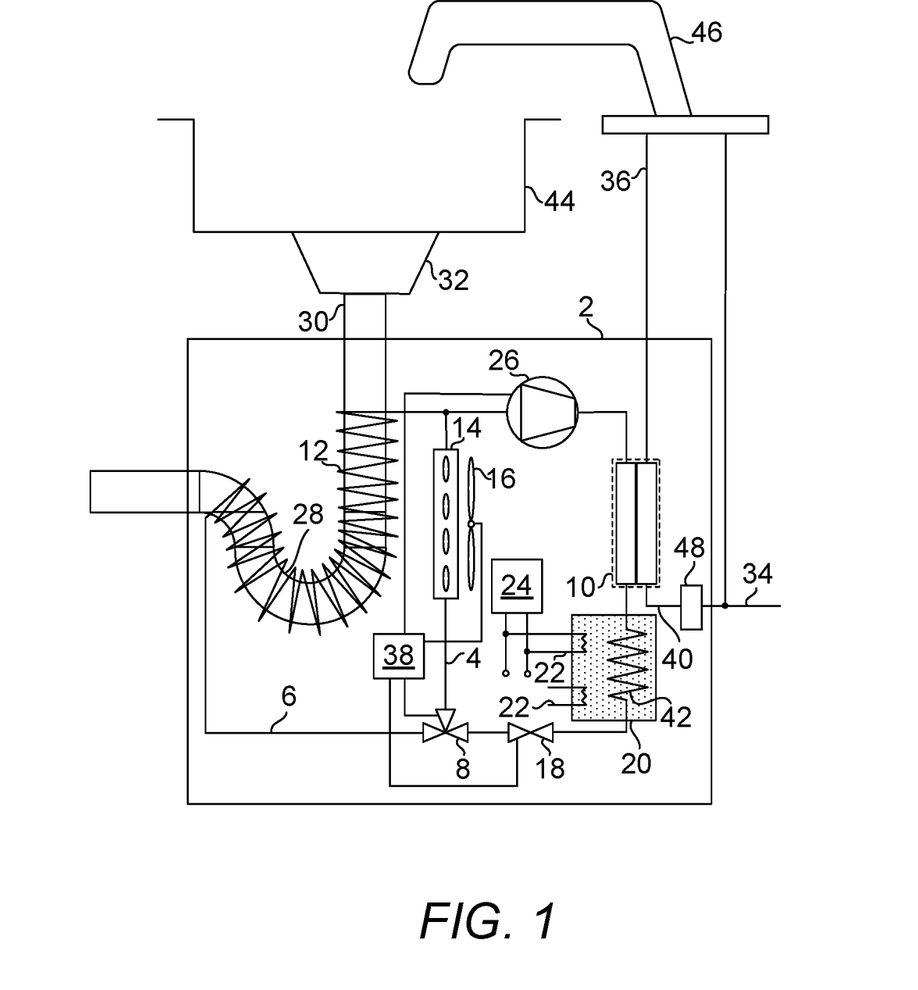
FIG. 1 is a diagram depicting an under sink heating system.
Figure 2:
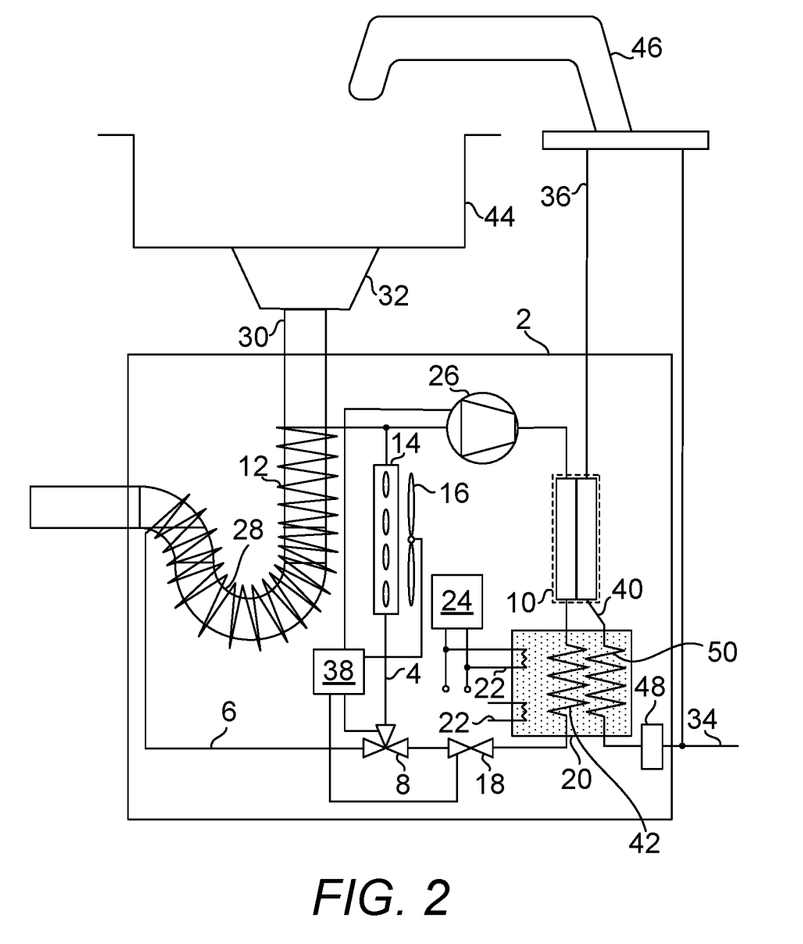
FIG. 2 is a diagram depicting an under sink heating system.

FIG. 1 is a diagram depicting an under sink heating system 2. FIG. 2 is a diagram depicting an under sink heating system 2. It shall be noted that a difference between the embodiment shown in FIG. 1 and the embodiment shown in FIG. 2 lies in the inlet end of the water conductor 40. The embodiment of FIG. 2 shows the inlet end as being disposed through a bath of tank 20 that serves as a thermal battery. A coil 50 is disposed on this inlet end to pre-heat the incoming flow through the water conductor 40 to decrease the thermal transfer gap that is required through heat exchanger 10 from the heat transfer fluid in the first fluid circuit 4 or the second fluid circuit 6. Each heating system 2 includes a water conductor 40, a valve 8, a heat exchanger 14, a blower 16, a coil 12, a final heat exchanger 10 and a control device 38. The water conductor 40 includes an inlet 34 and an outlet 36, the inlet 34 configured for receiving a domestic water flow. The valve 8 is configured to cooperate with a fluid moving device 26 which together are operable to selectively circulate a heat transfer fluid in a first fluid circuit 4 and/or a second fluid circuit 6. In one embodiment, the fluid moving device 26 is a compressor, wherein the heating system 2 further includes an expansion valve 18 fluidly connected to the first fluid conductor 4 and the second fluid conductor. The blower 16 is operable to supply a stream of fluid over the heat exchanger 14, wherein the heat exchanger 14 is fluidly connected to the first fluid circuit 4. Each of the first fluid circuit 4 and the second fluid circuit 6 is essentially a heat pump. The heat pump including a first fluid moving device 26, e.g., compressor, operable to circulate a heat transfer fluid in a first fluid conductor 4 through an evaporator (heat exchanger 14 in the first fluid circuit 4 or coil 12 in the second fluid circuit) where the refrigerant flowing therein expands by absorbing heat from the ambient environment of the heat exchanger 14 as in the case of the first fluid circuit 4 and from the contents of the J bend tube as in the case of the second fluid circuit 6. As expansion valve 18 is disposed upstream of heat exchanger 14 and coil 12, the heat transfer fluid, e.g., refrigerant, flowing therein expands upon passing the expansion valve 18 and before arriving at either heat exchanger 14 or coil 12. As the heat transfer fluid arrives at heat exchanger 10, the heat transfer fluid condenses, giving up heat to the domestic water flow in the water conductor 40.

The heat exchanger 14 is disposed to transfer heat between the heat transfer fluid and the heat exchanger 14, whereby heat is transferred between the heat transfer fluid and the stream of fluid over the heat exchanger 14. The coil 12 is fluidly connected to the second fluid circuit 6, wherein the coil 12 is configured to be disposed on a drainage tube 28, e.g., a J bend drainage tube, to transfer heat between the heat transfer fluid and the coil 12, whereby heat is transferred between the heat transfer fluid and contents of the drainage tube. In one embodiment, the coil 12 is configured to be wrapped around the drainage tube. The coil 12 need not be wrapped around the drainage tube provided that sufficient contact for thermal transmission is made between the two parts. A J bend drainage tube is so-termed as its shape resembles the letter J and it is useful for preventing sewer gases from entering a living space or another indoor space via the drainage tube 28 by having a curved tube portion that traps a small column of effluent 52. The final heat exchanger 10 is configured for thermally coupling the first fluid circuit 4 and the water conductor 40 and the second fluid circuit 6 and the water conductor 40, whereby heat is transferred between the heat transfer fluid to the domestic water flow. In one embodiment, the valve 8 is a 3-way valve which controls whether a refrigerant, e.g., carbon dioxide, etc., flow driven by the fluid moving device 26 flows through the first fluid circuit 4 or the second fluid circuit 6. In on embodiment, the 3-way valve is capable of being modulated.

In other words, the 3-away valve can be disposed in a position to allow a flow through both the first and second fluid circuits 4, 6 simultaneously. In one embodiment, the heating system further includes an ozone generator 48 configured for sanitizing the domestic water flow. In the embodiment shown, the ozone generator 48 is disposed at the inlet of the water conductor in order to allow sufficient dwell time for the generated ozone to carry out its function for removing odor and killing bacteria and other pathogens, etc.

If the present heating system 2 is unable to satisfy a hot water demand, in one embodiment, the heating system 2 further includes a thermal battery, an electrical battery 24 or both. A thermal battery is essentially a tank 20 including a bath and a portion 42 of the first fluid conductor 4 or the second fluid conductor 6 disposed through the bath of the tank 20. The portion 42 is essentially a heat exchanger being disposed within the tank 20 to transfer heat between the bath and the heat transfer fluid. In one embodiment, the bath is water. In another embodiment, the bath is a phase change material (PCM).

The price of electricity supply via an electricity grid can vary over the course of a day according to its demand. For instance, during periods of peak demand for electricity and when its supply is insufficient to cover the demand or when its supply barely meets the demand, electricity is priced at a higher level than when the supply well exceeds the demand. Therefore, it may be advantages to utilize electricity from the grid to charge the electric battery 24 in order to store electrical energy in the electric battery 24 in anticipation for later use when grid electricity is more costly. Alternatively and/or additionally, grid electricity can be used to generate heat energy stored in the tank 20 via one or more supplementary heating elements 22 even when there is not an immediate need for hot water when the cost of grid electricity is low. The cost of grid electricity may be observed and analyzed using the controller 38 by receiving grid electricity pricing data, e.g., over the internet.

Figure 3:
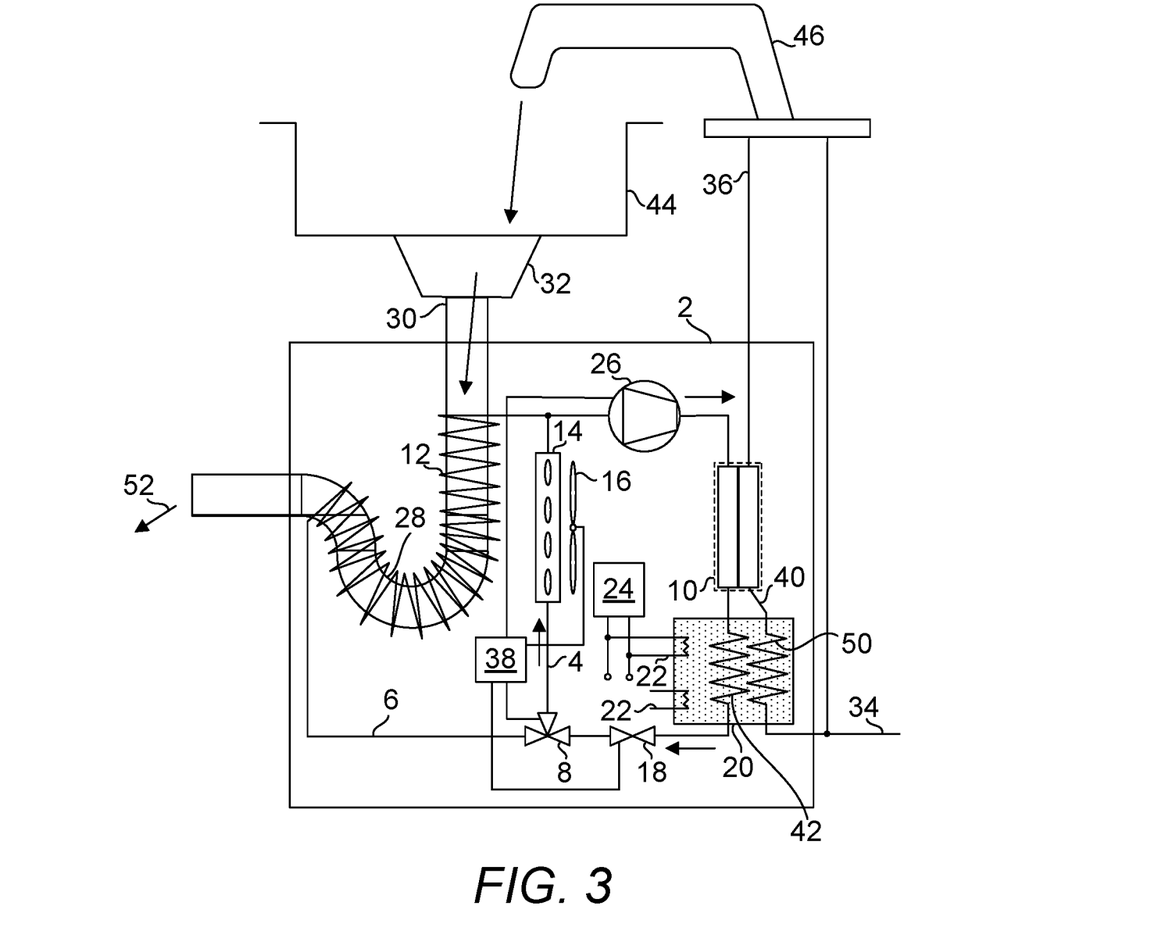
FIG. 3 is a diagram depicting the under sink heating system of FIG. 2 with the fluid moving device active in circulating a refrigerant flow in a circuit configured for extracting heat from the ambient environment under sink.

Although operating mode examples are shown with the embodiment of the heating system 2 of FIG. 2 in FIGS. 3 and 4, similar operating modes are applicable to the embodiment of the heating system 2 of FIG. 1. FIG. 3 is a diagram depicting the under sink heating system 2 of FIG. 2 with the fluid moving device active in circulating a refrigerant flow in a circuit configured for extracting heat from the ambient environment under sink. In the operating mode shown in FIG. 3, the control device 38 is operable to control the fluid moving device 26 to circulate the heat transfer fluid in the first fluid circuit 4, the blower 16 and the valve 8 by disposing the valve 8 in a first position in response to a first hot water demand at the faucet 46. Note that heat energy is received from the ambient environment of heat exchanger 14 and transferred to the flow through the water conductor 40. The control device 38 is further operable to control the fluid moving device 26 to circulate the heat transfer fluid in the first fluid circuit 4, the blower 16 and the valve 8 by disposing the valve 8 in a first position in response to a first thermal charging demand when a hot water demand is inactive, e.g., when faucet 46 is turned off.

Figure 4:
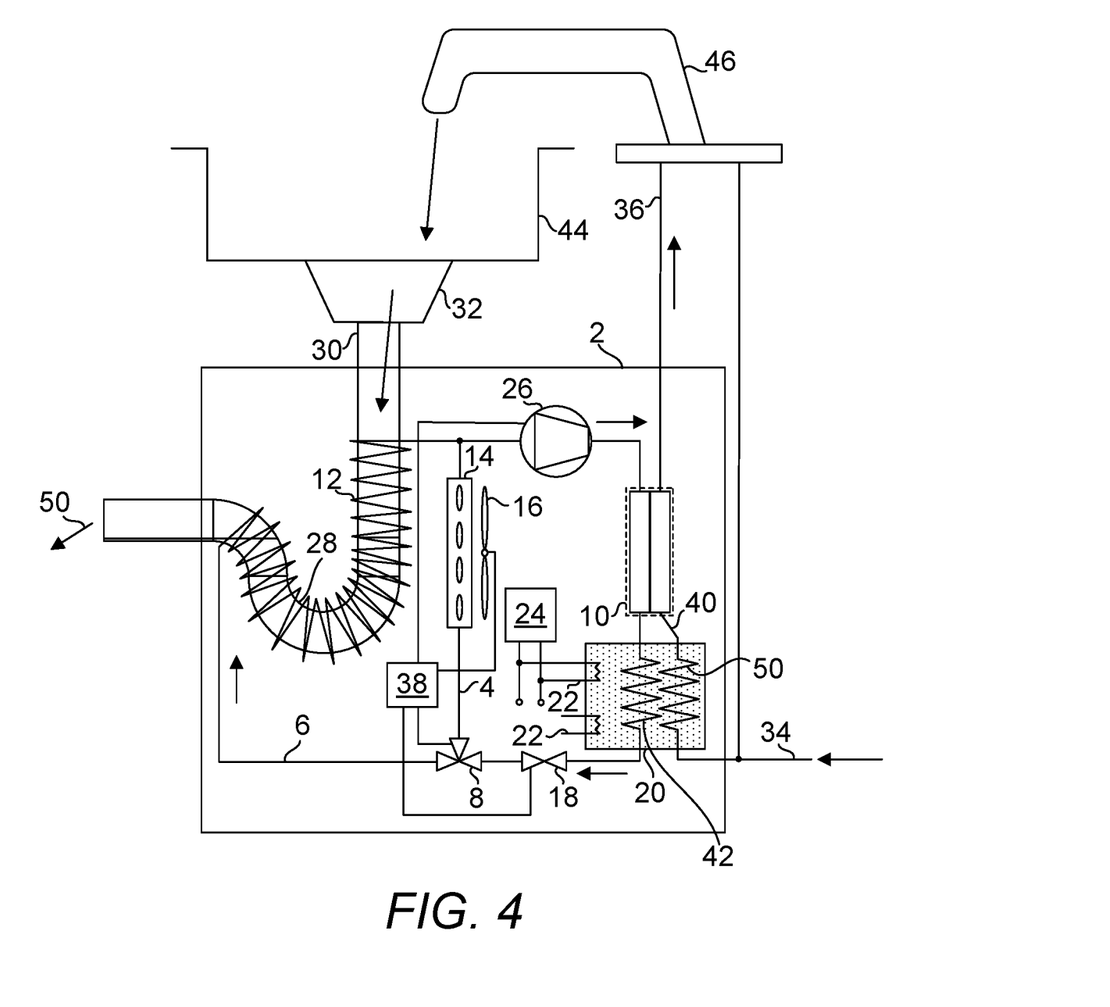
FIG. 4 is a diagram depicting the under sink heating system of FIG. 2 with the fluid moving device active in circulating a refrigerant flow in a coil configured for receiving heat from a J bend drainage tube under sink.

FIG. 4 is a diagram depicting the under sink heating system of FIG. 2 with the fluid moving device active in circulating a refrigerant flow in a coil 12 configured for receiving heat from a J bend drainage tube 28 under sink 44. A large amount of heat energy remains in an effluent of a hot water demand. When hot water is used, only a small amount of heat energy is extracted by the user or a sink system, e.g., the sink 44 itself, drain tailpiece 30, drain fitting 32, etc. The heat energy not extracted by these components will subsequently follow the effluent 52 to a septic or sewer system, unused and dissipated through the ambient environment of the septic or sewer system. In the operating mode shown in FIG. 4, the control device 38 is operable to control the fluid moving device to circulate the heat transfer fluid in the second fluid circuit 6 and the valve 8 by disposing the valve 8 in a second position in response to a second hot water demand. The control device 38 is further operable to control the fluid moving device 26 to circulate the heat transfer fluid in the second fluid circuit 6, and the valve 8 by disposing the valve 8 in a second position in response to a second thermal charging demand. In both of these operating modes, some heat energy of the effluent 52 through the J bend tube is extracted, preventing the total loss of the remaining heat energy in the effluent. In the embodiment shown, the coil is preferably disposed at least to encompass the portion of the J bend tube where the effluent can collect as the dwell time of this collection of the effluent is the highest, affording the highest heat transfer rate from the effluent 52 to the heat transfer fluid through the second fluid circuit 6.

Figure 5:
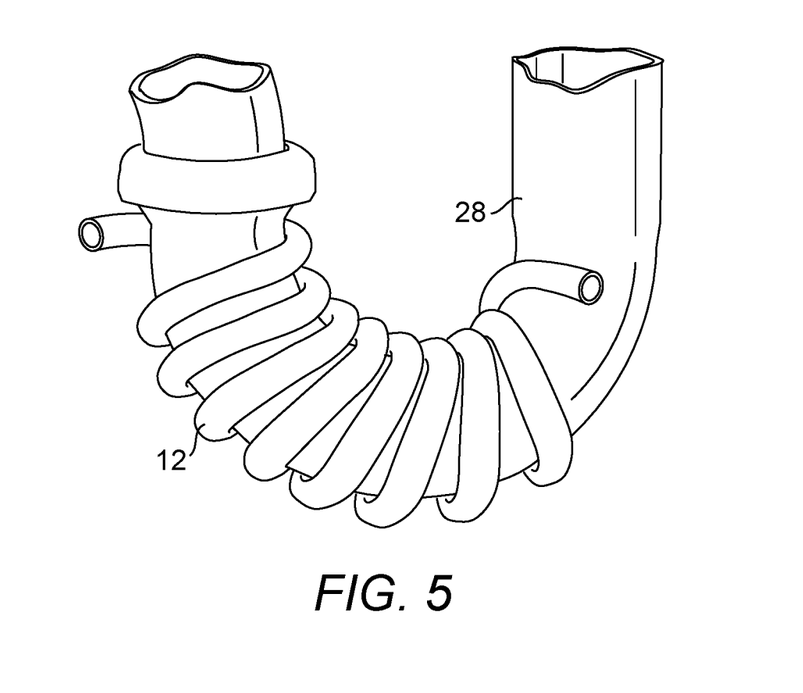
FIG. 5 is a diagram depicting a partial view of a coil disposed on a J bend drainage tube.

FIG. 5 is a diagram depicting a partial view of a coil 12 disposed on a J bend drainage tube 28. The coil 12 is preferably disposed on the J bend tube 28 as tightly as possible, making as much contact with the J bend tube 28 as possible to maximize heat transfer at least via conduction. In one embodiment, the coil 12 is a copper tube and the J bend tube 28 is constructed from a metallic material or another excellent thermal conductor.

Figure 6:
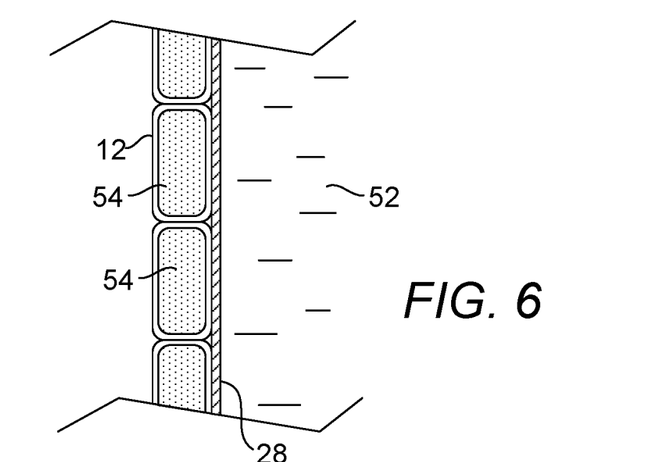
FIG. 6 is a diagram depicting a partial cross-sectional view of a coil disposed on a drainage tube.
Figure 7:
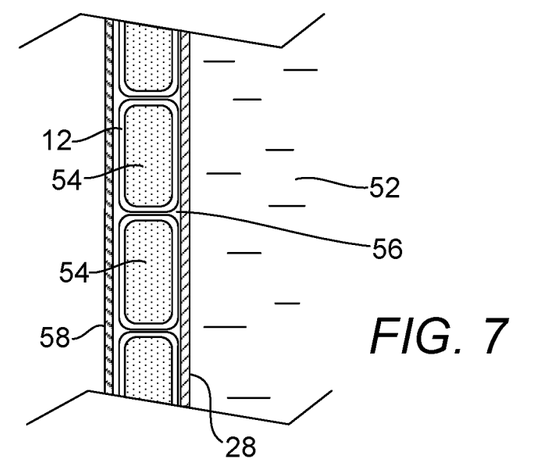
FIG. 7 is a diagram depicting a partial cross-sectional view of a coil disposed on a drainage tube.

FIG. 6 is a diagram depicting a partial cross-sectional view of a coil 12 disposed on a drainage tube 28. It shall be noted that in this embodiment, a coil 12 with rectangular cross-sectional profile is used such that the thermal contact surface area of the coil 12 and the drainage tube 28 can be maximized which in turn causes heat transfer between the effluent 52 and the heat transfer fluid 54 to be maximized. FIG. 7 is a diagram depicting a partial cross-sectional view of a coil 12 disposed on a drainage tube 28. Here, a thermal paste 54 is disposed in the cavities between a coil 12 and a drainage tube 28 to enhance thermal transfer between the effluent 52 and the heat transfer fluid 54 further.

Figure 8:
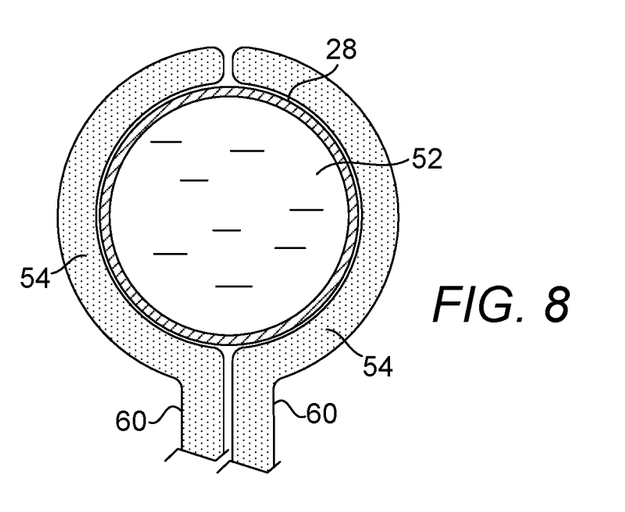
FIG. 8 is a diagram depicting a heat exchanger configuration capable of being clamped onto a drainage tube.

FIG. 8 is a diagram depicting a heat exchanger configuration capable of being clamped onto a drainage tube. Here, the coil 12 is configured in two halves 60 as shown. This configuration allows coil 12 to be applied to a drainage tube 28 without requiring the drainage tube 28 to be inserted through the lumen of the coil 12 in the lengthwise direction of the lumen, making installation of the present heating system and retrofitting of the present coil 12 onto an installed drainage tube 28 easier.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. An under sink heating system configured to be adapted to a sink drain of a sink, said under sink heating system comprising:
   (a) a drainage tube comprising a J bend drainage tube configured to be adapted to the sink drain, said J bend drainage tube comprises a curved tube portion for holding contents disposed through the sink drain into said drainage tube;
   (b) a water conductor comprising an inlet and an outlet, said inlet configured for receiving a domestic water flow;
   (c) a valve configured to cooperate with a fluid moving device which together operable to selectively circulate a heat transfer fluid in at least one of a first fluid circuit and a second fluid circuit;
   (d) a heat exchanger and a blower operable to supply a stream of fluid over said heat exchanger, wherein said heat exchanger is fluidly connected to said first fluid circuit, wherein said heat exchanger being disposed to transfer heat between said heat transfer fluid and said heat exchanger whereby heat is transferred between said heat transfer fluid and said stream of fluid in an ambient under the sink over said heat exchanger;
   (e) a coil fluidly connected to said second fluid circuit, wherein said coil is configured to be disposed on said drainage tube to transfer heat between said heat transfer fluid and said coil, whereby heat is transferred between said heat transfer fluid and the contents of said drainage tube;
   (f) a final heat exchanger configured for thermally coupling said first fluid circuit and said water conductor and thermally coupling said second fluid circuit and said water conductor, whereby heat is transferred between said heat transfer fluid to the domestic water flow;
   (g) a tank comprising a bath, each of a portion of said first fluid circuit and a portion of said second fluid circuit disposed through said bath of said tank is a heat exchanger being disposed to transfer heat between said bath and said heat transfer fluid, wherein said bath comprises a phase change material (PCM); and
   (h) a control device operable to control said fluid moving device to circulate said heat transfer fluid in said first fluid circuit, said blower and said valve by disposing said valve in a first position in response to a first hot water demand, said control device being further operable to control said fluid moving device to circulate said heat transfer fluid in said second fluid circuit and said valve by disposing said valve in a second position in response to a second hot water demand, said control device being further operable to control said fluid moving device to circulate said heat transfer fluid in said first fluid circuit, said blower and said valve by disposing said valve in a first position in response to a first thermal charging demand and said control device being further operable to control said fluid moving device to circulate said heat transfer fluid in said second fluid circuit and said valve by disposing said valve in a second position in response to a second thermal charging demand.

2. The heating system of claim 1, wherein said fluid moving device is a compressor, wherein said heating system further comprises an expansion valve fluidly connected to said first fluid circuit and said second fluid circuit.

3. The heating system of claim 1, further comprising at least one heating element configured to be disposed within said bath of said tank.

4. The heating system of claim 1, wherein said inlet of said water conductor is disposed through said bath of said tank.

5. The heating system of claim 4, wherein said inlet of said water conductor comprises a coil configured for pre-heating the domestic water flow.

6. The heating system of claim 1, wherein said heat transfer fluid is a refrigerant.

7. The heating system of claim 1, further comprising an electric battery configured for storing electric power and powering at least one of said fluid moving device, said blower and said control device.

8. The heating system of claim 1, wherein said valve is a 3-way valve.

9. The heating system of claim 1, further comprising an ozone generator configured for sanitizing the domestic water flow.

10. An under sink heating system configured to be adapted to a sink drain of a sink, said under sink heating system comprising:
   (a) a drainage tube comprising a J bend drainage tube configured to be adapted to the sink drain, said J bend drainage tube comprises a curved tube portion for holding contents disposed through the sink drain into said drainage tube;
   (b) a water conductor comprising an inlet and an outlet, said inlet configured for receiving a domestic water flow, wherein said inlet of said water conductor comprises a first coil configured for pre-heating the domestic water flow;
   (c) a valve configured to cooperate with a fluid moving device which together operable to selectively circulate a heat transfer fluid in at least one of a first fluid circuit and a second fluid circuit;
   (d) a heat exchanger and a blower operable to supply a stream of fluid over said heat exchanger, wherein said heat exchanger is fluidly connected to said first fluid circuit, wherein said heat exchanger being disposed to transfer heat between said heat transfer fluid and said heat exchanger whereby heat is transferred between said heat transfer fluid and said stream of fluid in an ambient under the sink over said heat exchanger;
   (e) a second coil fluidly connected to said second fluid circuit, wherein said second coil is configured to be disposed on said drainage tube to transfer heat between said heat transfer fluid and said second coil, whereby heat is transferred between said heat transfer fluid and the contents of said drainage tube;
   (f) a final heat exchanger configured for thermally coupling said first fluid circuit and said water conductor and thermally coupling said second fluid circuit and said water conductor, whereby heat is transferred between said heat transfer fluid to the domestic water flow;

(g) a tank comprising a bath, each of a portion of said first fluid circuit and a portion of said second fluid circuit disposed through said bath of said tank is a heat exchanger being disposed to transfer heat between said bath and said heat transfer fluid, wherein said inlet of said water conductor is disposed through said bath of said tank and said bath comprises a phase change material (PCM); and (h) a control device operable to control said fluid moving device to circulate said heat transfer fluid in said first fluid circuit, said blower and said valve by disposing said valve in a first position in response to a first hot water demand, said control device being further operable to control said fluid moving device to circulate said heat transfer fluid in said second fluid circuit and said valve by disposing said valve in a second position in response to a second hot water demand, said control device being further operable to control said fluid moving device to circulate said heat transfer fluid in said first fluid circuit, said blower and said valve by disposing said valve in a first position in response to a first thermal charging demand and said control device being further operable to control said fluid moving device to circulate said heat transfer fluid in said second fluid circuit and said valve by disposing said valve in a second position in response to a second thermal charging demand.

11. The heating system of claim 10, wherein said fluid moving device is a compressor, wherein said heating system further comprises an expansion valve fluidly connected to said first fluid circuit and said second fluid circuit.

12. The heating system of claim 10, further comprising at least one heating element configured to be disposed within said bath of said tank.

13. The heating system of claim 10, wherein said inlet of said water conductor is disposed through said bath of said tank.

14. The heating system of claim 10, further comprising an electric battery configured for storing electric power and powering at least one of said fluid moving device, said blower and said control device.

15. The heating system of claim 10, wherein said valve is a 3-way valve.

16. The heating system of claim 10, further comprising an ozone generator configured for sanitizing the domestic water flow.

* * * * *